United States Patent
Zaugg et al.

(10) Patent No.: US 10,670,110 B2
(45) Date of Patent: Jun. 2, 2020

(54) SPRING ASSEMBLY WITH ADHERED END CAPS, DAMPER HAVING SPRING ASSEMBLIES WITH ADHERED END CAPS, AND METHOD OF FABRICATING A SPRING ASSEMBLY WITH ADHERED END CAPS

(71) Applicant: Schaeffler Technologies AG & Co. KG, Herzogenaurach (DE)

(72) Inventors: Brian Zaugg, Millersburg, OH (US); Drew Hilty, Wooster, OH (US); Scott Strong, Wooster, OH (US); Shivakala Gargeyi Baipa, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 6 days.

(21) Appl. No.: 15/996,584

(22) Filed: Jun. 4, 2018

(65) Prior Publication Data
US 2019/0368571 A1 Dec. 5, 2019

(51) Int. Cl.
*F16F 15/10* (2006.01)
*F16F 3/04* (2006.01)

(52) U.S. Cl.
CPC .............. *F16F 15/10* (2013.01); *F16F 3/04* (2013.01); *F16F 2226/042* (2013.01); *F16F 2236/02* (2013.01); *F16F 2238/026* (2013.01)

(58) Field of Classification Search
CPC ..... F16H 2045/0221; F16H 2045/0226; F16H 2045/0247; F16F 15/10; F16F 3/04; F16F 2238/026; F16F 2236/02
See application file for complete search history.

(56) References Cited

U.S. PATENT DOCUMENTS

| | | | | |
|---|---|---|---|---|
| 4,911,437 A | * | 3/1990 | Schulkin | A63B 21/05 482/124 |
| 4,959,039 A | * | 9/1990 | Naudin | F16F 15/12333 192/205 |
| 4,987,980 A | * | 1/1991 | Fujimoto | F16F 15/12346 192/213.1 |
| 5,218,884 A | * | 6/1993 | Rohrle | F16F 15/13438 192/205 |
| 5,800,270 A | | 9/1998 | Uenohara et al. | |
| 6,041,905 A | * | 3/2000 | Fujimoto | F16F 1/125 192/205 |
| 8,801,524 B2 | * | 8/2014 | Takikawa | F16H 45/02 464/68.9 |
| 2009/0247307 A1 | * | 10/2009 | Ishikawa | F16F 15/12373 464/68.8 |

(Continued)

FOREIGN PATENT DOCUMENTS

| | | |
|---|---|---|
| JP | 07224850 A | 8/1995 |
| JP | 2007064345 A | 3/2007 |

*Primary Examiner* — Thomas E Lazo

(57) ABSTRACT

A coil spring assembly, including: a coil spring with a first longitudinal end and a second longitudinal end; a first end cap fixedly connected to the first longitudinal end with a first adhesive; and a second end cap fixedly connected to the second longitudinal end with a second adhesive. A method of fabricating a coil spring assembly, including: fixedly connecting, with a first adhesive, a first end cap to a first longitudinal end of a coil spring; and fixedly connecting, with a second adhesive, a second end cap to a second longitudinal end of the coil spring.

18 Claims, 13 Drawing Sheets

(56) References Cited

U.S. PATENT DOCUMENTS

| | | |
|---|---|---|
| 2015/0122610 A1 | 5/2015 | Antchak et al. |
| 2016/0208863 A1 | 7/2016 | Fujii et al. |
| 2016/0365785 A1 | 12/2016 | Mao et al. |
| 2018/0039298 A1* | 2/2018 | Adoline ................ B60T 11/165 |

* cited by examiner

SPRING ASSEMBLY WITH ADHERED END CAPS, DAMPER HAVING SPRING ASSEMBLIES WITH ADHERED END CAPS, AND METHOD OF FABRICATING A SPRING ASSEMBLY WITH ADHERED END CAPS

TECHNICAL FIELD

The present disclosure relates to a spring assembly including a coil spring with adhered end caps. The present disclosure also relates to a damper including coil springs with adhered end caps, and to a method of fabricating a spring assembly including a coil spring with adhered end caps.

BACKGROUND

A known coil spring with press-fit end caps includes dead coil turns with radially inner surfaces fixed to the end caps. The fixed contact between the end caps and radially inner surfaces prevents the deal coil turns from expanding or contracting. Thus, the dead coil turns do not contribute to the spring rate of the coil spring. Further, press-fitting of end caps is not suitable for nitrided coil springs, due to cracking of coil turns due to pressure exerted by the end caps on the coil springs.

SUMMARY

According to aspects illustrated herein, there is provided a coil spring assembly, including: a coil spring with a first longitudinal end and a second longitudinal end; a first end cap fixedly connected to the first longitudinal end with a first adhesive; and a second end cap fixedly connected to the second longitudinal end with a second adhesive.

According to aspects illustrated herein, there is provided a vibration damper, including: an input arranged to receive rotational torque; an output arranged to transmit the rotational torque; and a plurality of coil spring assemblies arranged to transmit the torque from the input to the output. Each coil spring assembly includes: a respective coil spring including a respective first longitudinal end and a respective second longitudinal end; a respective first end cap; a respective second end cap; a first adhesive fixedly connecting the respective first end cap to the respective first longitudinal end; and a second adhesive fixedly connecting the respective second end cap to the respective second longitudinal end.

According to aspects illustrated herein, there is provided a method of fabricating a coil spring assembly, including: fixedly connecting, with a first adhesive, a first end cap to a first longitudinal end of a coil spring; and fixedly connecting, with a second adhesive, a second end cap to a second longitudinal end of the coil spring.

BRIEF DESCRIPTION OF THE DRAWINGS

Various embodiments are disclosed, by way of example only with reference to the accompanying schematic drawings in which corresponding reference symbols indicate corresponding parts in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 13:
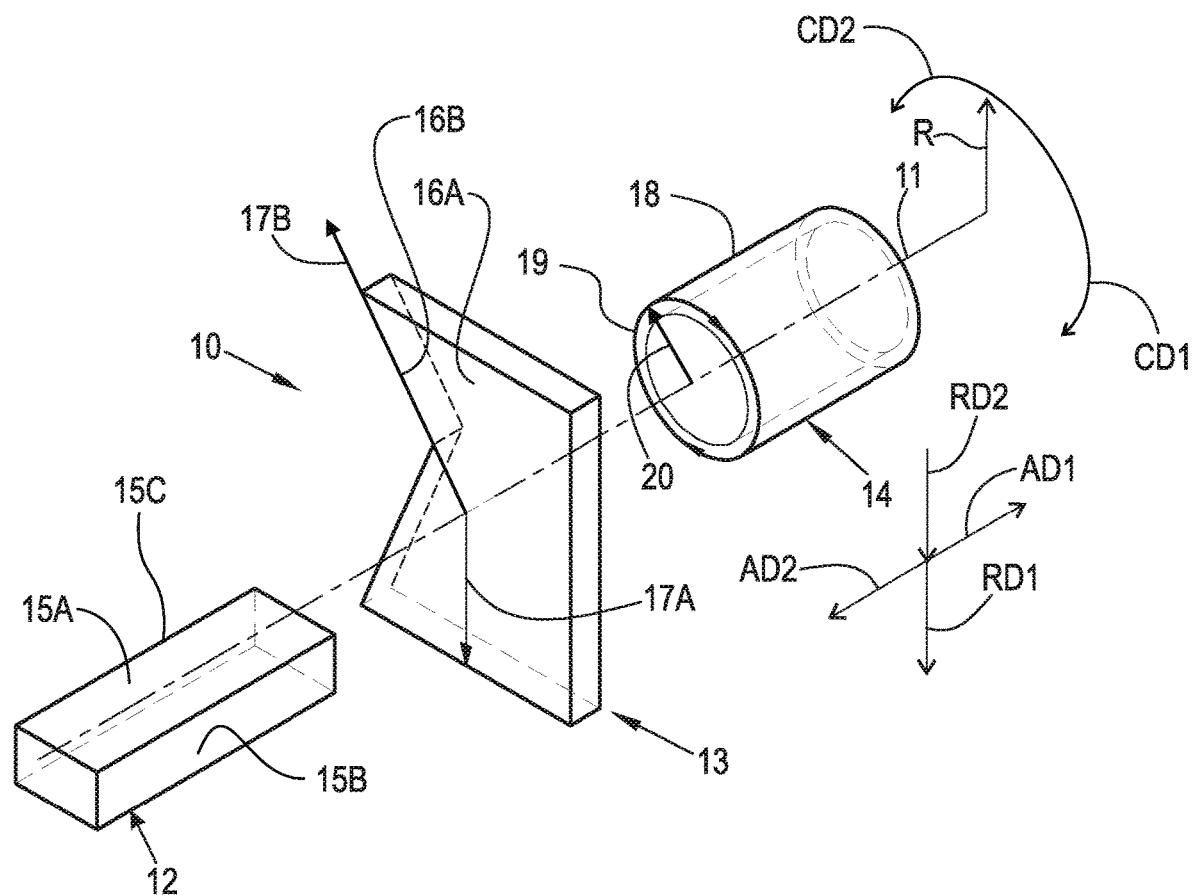
FIG. 13 is a perspective view of a cylindrical coordinate system demonstrating spatial terminology used in the present application.

FIG. 13 is a perspective view of cylindrical coordinate system 10 demonstrating spatial terminology used in the present application. The present application is at least partially described within the context of a cylindrical coordinate system. System 10 includes axis of rotation, or helical axis 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
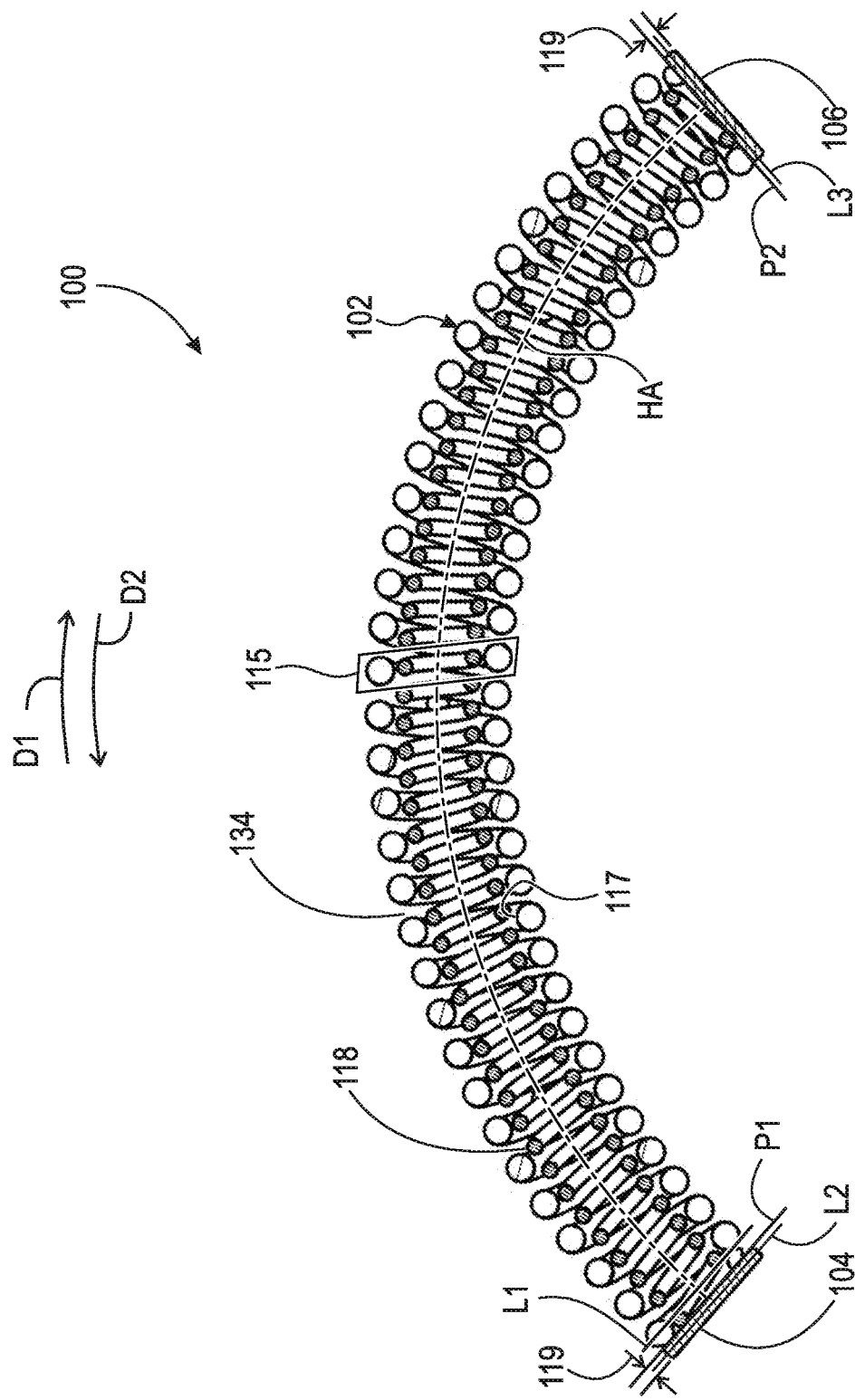
FIG. 1 is a cross-sectional view of a spring assembly with nested arc coil springs and adhered end caps.

FIG. 1 is a cross-sectional view of a spring assembly with nested arc coil springs and adhered end caps.

Figure 2A:
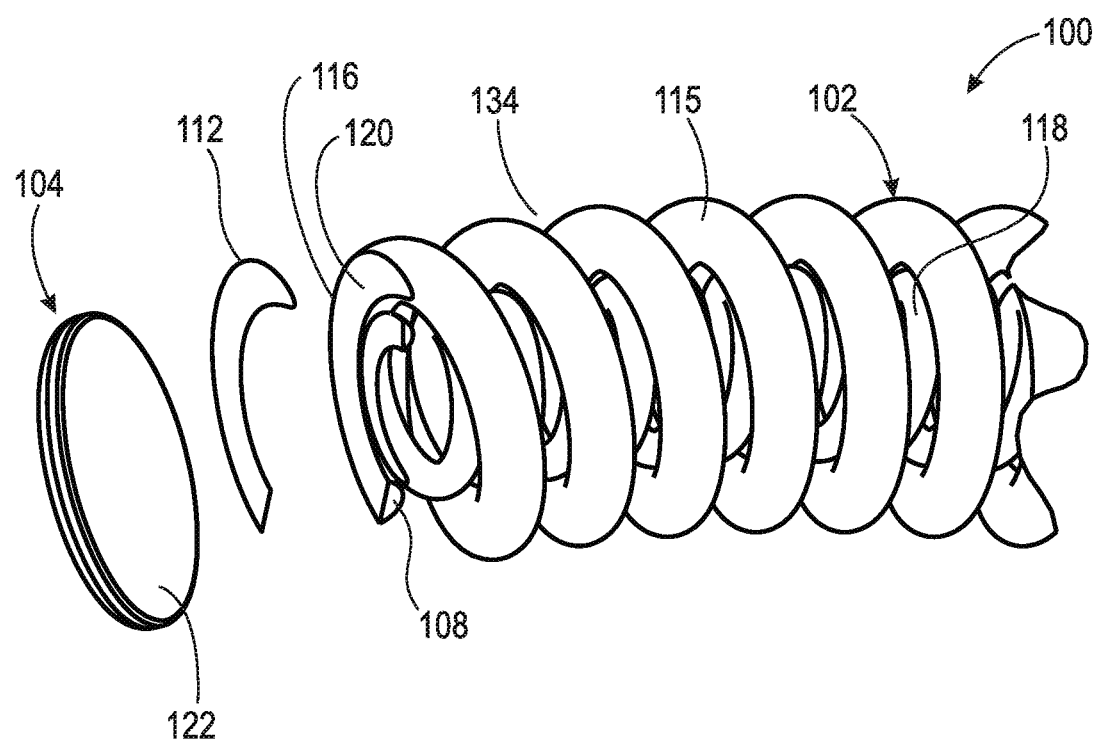
FIG. 2A is an exploded view of one longitudinal end of the spring assembly shown in FIG. 1.

FIG. 2A is an exploded view of one longitudinal end of the spring assembly shown in FIG. 1.

Figure 2B:
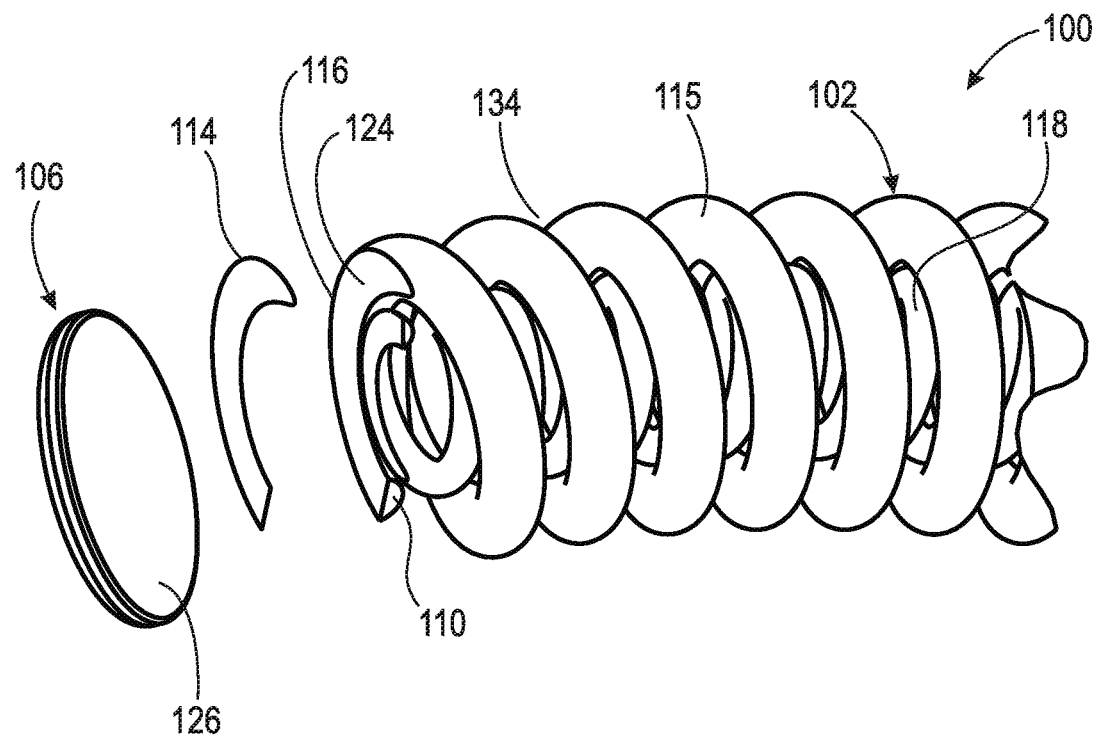
FIG. 2B is an exploded view of the other longitudinal end of the spring assembly shown in FIG. 1.

FIG. 2B is an exploded view of the other longitudinal end of the spring assembly shown in FIG. 1. The following should be viewed in light of FIGS. 1 through 28. In the example of FIGS. 1 through 28, coil spring assembly 100 includes: arc coil spring 102; end cap 104; and end cap 106. Coil spring 102 includes: helical axis HA (also known as a longitudinal axis or a coil axis); longitudinal end 108; and longitudinal end 110. End cap 104 is fixed to longitudinal end 108 with adhesive 112. End cap 106 is fixed to longitudinal end 110 with adhesive 114. The thickness of adhesives 112 and 114 in FIGS. 2A and 2B is exaggerated for purposes of presentation. Adhesive 112 and adhesive 114 can be any adhesive known in the art. Coil spring 102 includes full coil turns 115; dead coil turns 116 at ends 108 and 110; and radially inner surface 117 formed by turns 115. In general, a full coil turn, for example coil turn 115, is a 360 degree portion of spring 102 about axis HA. By "helical axis," we mean an axis extending from end 108 to end 110, surrounded by turns 115 and 116 and surface 117 and centered with respect to turns 115 and 116 and surface 117. Thus, surface 117 faces axis HA.

In the example of FIG. 1: assembly 100 includes inner arc coil spring 118; and end caps 104 and 106 are not fixed to spring 118 with adhesive. In an example embodiment (not shown), end caps 104 and 106 are adhered to spring 102 and spring 118. In an example embodiment (not shown), end caps 104 and 106 are adhered to spring 118 and are not adhered to spring 102. In an example embodiment (not shown): end cap 104 is adhered to one of spring 102 or 118; and end cap 106 is adhered to the other of spring 102 or 118. In an example embodiment, adhesive 112 and 114 are the same adhesive. In an example embodiment, adhesive 112 and adhesive 114 are not the same adhesive. Adhesive 112 and adhesive 114 are further described below.

In an example embodiment: no portion of end cap 104 is fixedly connected to radially inner surface 117; or no portion of end cap 106 is fixedly connected to radially inner surface 117. In an example embodiment: no portion of end cap 104 is fixedly connected to radially inner surface 117; and no portion of end cap 106 is fixedly connected to radially inner surface 117. In an example embodiment, end cap 104 and end cap 106 have a uniform thickness 119.

In an example embodiment: no portion of end cap 104 is in contact with radially inner surface 117; or no portion of end cap 106 is in contact with radially inner surface 117. In an example embodiment: no portion of end cap 104 is in contact with radially inner surface 117; and no portion of end cap 106 is in contact with radially inner surface 117.

Longitudinal end 108 includes planar surface 120. End cap 104 includes planar surface 122. Adhesive 112 fixedly connects surface 122 to surface 120. In an example embodiment, plane P1 is co-planar with surface 120 and no portion of end cap 104 extends past plane P1 in direction D1 parallel to axis HA. In an example embodiment, surface 120 and surface 122 are orthogonal to axis HA.

End 110 includes planar surface 124. End cap 106 includes planar surface 126. Adhesive 114 fixedly connects surface 126 to surface 124. In an example embodiment, plane P2 is co-planar with surface 124 and no portion of end cap 106 extends past plane P2 in direction D2, opposite direction D1. In an example embodiment, surface 124 and surface 126 are orthogonal to axis HA.

Note that surface 117 at dead coil turns 116 is not in contact with end cap 104 or end cap 106. Thus, dead coil turns 116 are formed by contact between: surfaces 120 and 122; and surfaces 124 and 126.

In an example embodiment, no line, orthogonal to the helical axis, intersects: spring 102 and end cap 104; or spring 102 and end cap 106. For example: line L1, orthogonal to axis HA, intersects dead coil 116 without intersecting cap 104 or cap 106; line L2, orthogonal to axis HA, intersects cap 104 without intersecting spring 102; and line L3, orthogonal to axis HA, intersects cap 106 without intersecting spring 102.

Figure 3:
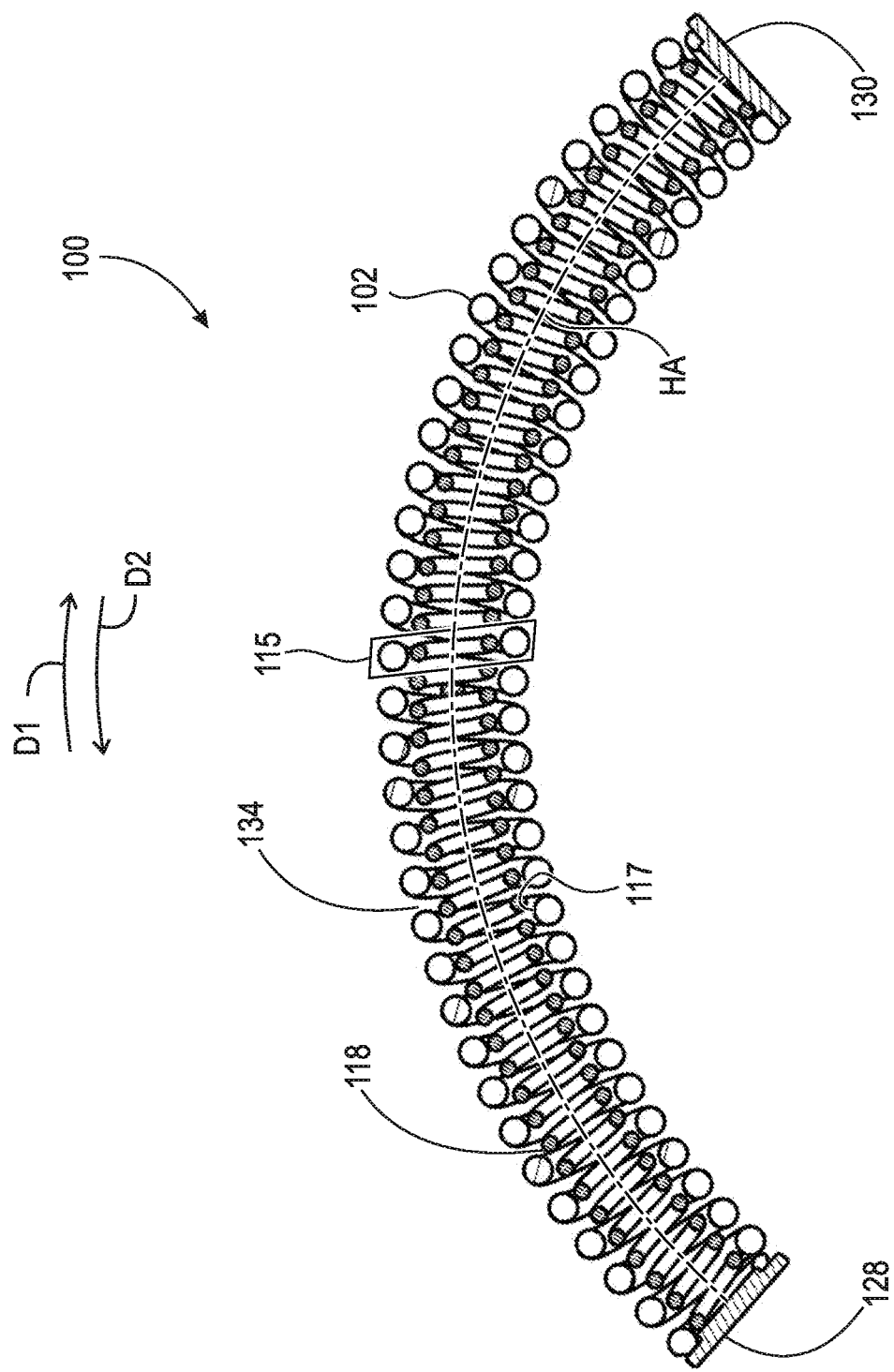
FIG. 3 is a cross-sectional view of a spring assembly with nested arc coil springs and adhered end caps including centering protrusions.

FIG. 3 is a cross-sectional view of a spring assembly with nested arc coil springs and adhered end caps including centering protrusions.

Figure 4A:
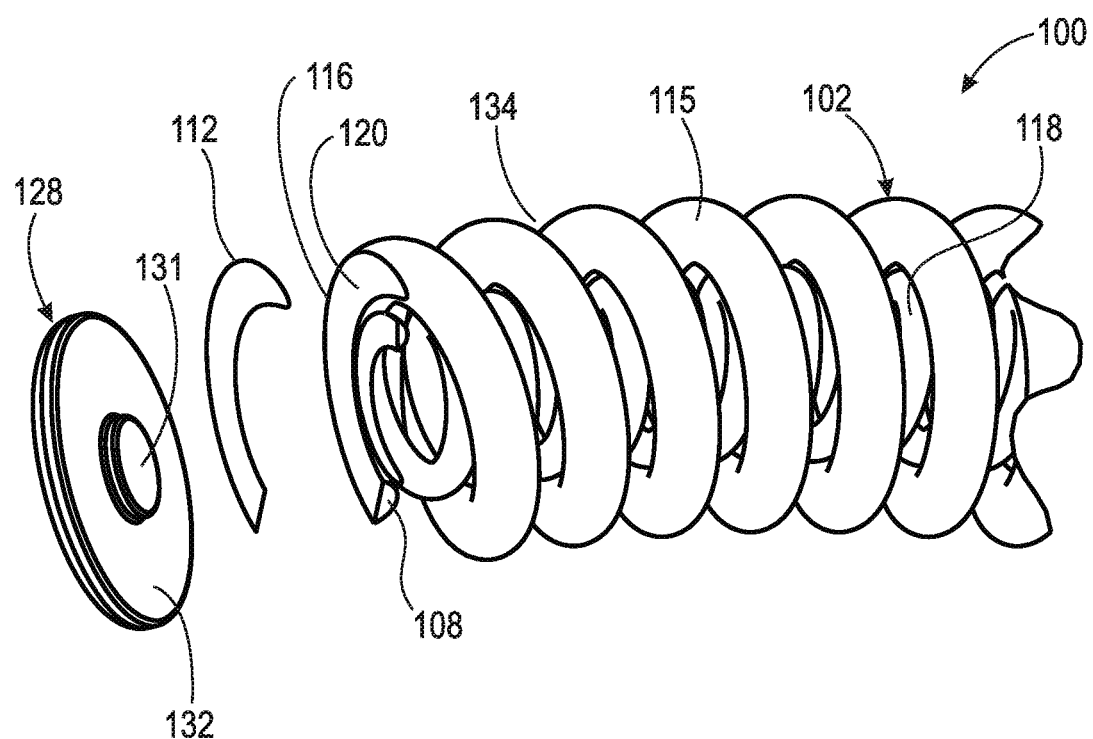
FIG. 4A is an exploded view of one longitudinal end of the spring assembly shown in FIG. 3.

FIG. 4A is an exploded view of one longitudinal end of the spring assembly shown in FIG. 3.

Figure 4B:
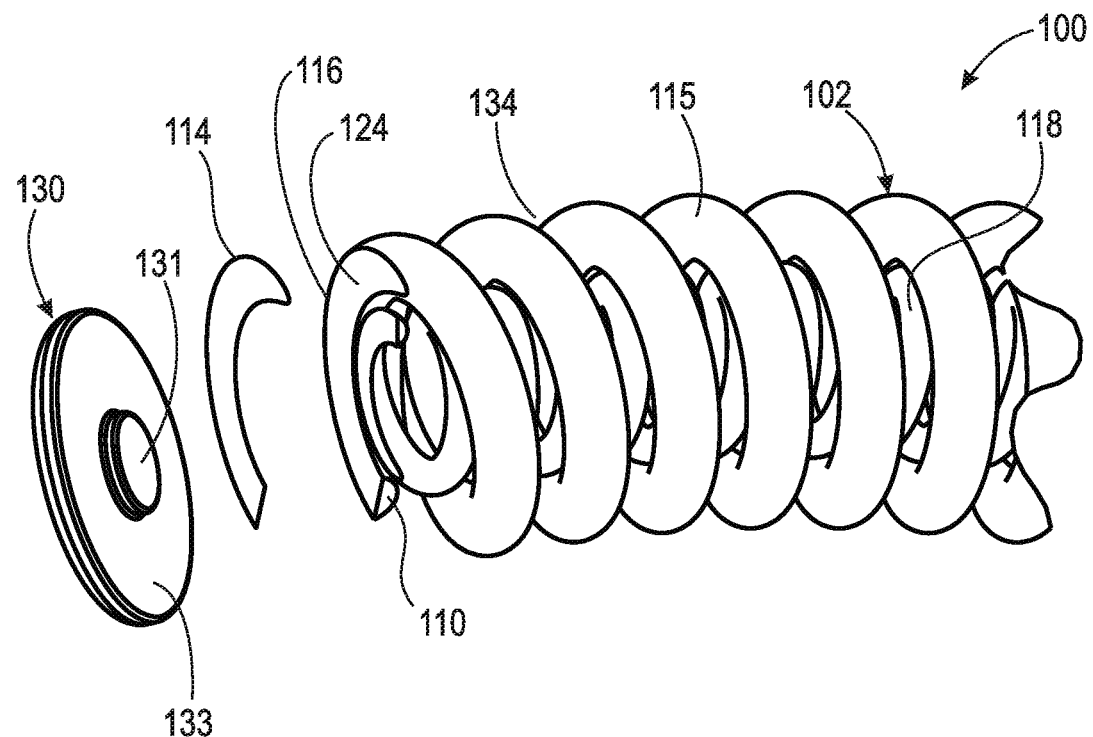
FIG. 4B is an exploded view of the other longitudinal end of the spring assembly shown in FIG. 3.

FIG. 4B is an exploded view of the other longitudinal end of the spring assembly shown in FIG. 3. The following should be viewed in light of FIGS. 1 through 4B. In the example of FIGS. 3 through 4B, in assembly 100, end caps 128 and 130 replace end caps 104 and 106, respectively. End caps 128 and 130 include centering protrusion 131. End cap 128 is fixed to longitudinal end 108 with adhesive 112. End cap 130 is fixed to longitudinal end 110 with adhesive 114. The thickness of adhesives 112 and 114 in FIGS. 4A and 4B is exaggerated for purposes of presentation. In the example of FIG. 3: assembly 100 includes inner arc coil spring 118; and end caps 128 and 130 are not fixed to spring 118 with adhesive.

In an example embodiment (not shown), end caps 128 and 130 are adhered to spring 102 and spring 118. In an example embodiment (not shown), end caps 128 and 130 are adhered to spring 118 and are not adhered to spring 102. In an example embodiment (not shown): end cap 128 is adhered to one of spring 102 or 118; and end cap 130 is adhered to the other of spring 102 or 118. In an example embodiment: no portion of end cap 128 is fixedly connected to radially inner surface 117; or no portion of end cap 130 is fixedly connected to radially inner surface 117. In an example embodiment: no portion of end cap 128 is fixedly connected to radially inner surface 117; and no portion of end cap 130 is fixedly connected to radially inner surface 117.

End cap 128 includes planar surface 132. Adhesive 112 fixedly connects surface 132 to surface 120. In an example embodiment, surface 120 and surface 132 are orthogonal to axis HA. End cap 130 includes planar surface 133. Adhesive 114 fixedly connects surface 133 to surface 124. In an example embodiment, surface 124 and surface 133 are orthogonal to axis HA.

On cap 128, protrusions 131 extend past surface 120 in direction D1 and contact surface 117 to center cap 128 with respect to surface 117. On cap 130, protrusions 131 extend past surface 124 in direction D2 and contact surface 117 to center cap 130 with respect to surface 117.

Protrusions 131 contact surface 117; however, protrusions 131 are not compressively engaged with surface 117 or adhered to surface 117, and do not prevent movement of coil turns 115 in contact with protrusions 131. Stated otherwise, protrusions 131 are not fixedly connected to surface 117 and do not produce dead coil turns in spring 102. Protrusions 131 are not limited to a particular number, size, shape or configuration. Thus, dead coil turns 116 are formed by contact between: surfaces 120 and 132; and surfaces 124 and 133.

The following should be viewed in light of FIGS. 1 through 4B. The only dead coil turns in assembly 100 are dead coil turns 116 at ends 108 and 110. The reduction in the number of dead coils is described in a variety of ways. Structurally, as noted above, caps 104, 106, 128 and 130 are not fixed to inner surface 117; therefore, coil turns 115 are free to expand and contract without interference from end caps 104 and 106 or end caps 128 and 130.

The reduction of dead coils also is describable in terms of spaces 134 between adjacent coil turns 115 and 116 or between adjacent coil turns 115. By "adjacent," we mean adjacent with respect to axis HA and direction D1 or D2. End cap 104 is displaceable, with respect to end cap 106 and along axis HA and end cap 106 is displaceable, with respect to end cap 104 and along axis HA. Since end caps 104 and 106 are not fixed to surface 117, such displacement increases or decreases spaces 134 in spring 102. For example, displacing end cap 104 toward end cap 106 and along axis HA compresses spring 102 and decreases spaces 134. In an example embodiment, every space 134 increases or decreases with displacement between caps 104 and 106.

End cap 128 is displaceable, with respect to end cap 130 and along axis HA and end cap 130 is displaceable, with respect to end cap 128 and along axis HA. Since end caps 128 and 130 are not fixed to surface 117, such displacement increases or decreases spaces 134 in spring 102. For example, displacing end cap 128 toward end cap 130 and along axis HA compresses spring 102 and decreases spaces 134. In an example embodiment, every space 134 increases or decreases with displacement between caps 104 and 106.

Figure 5:
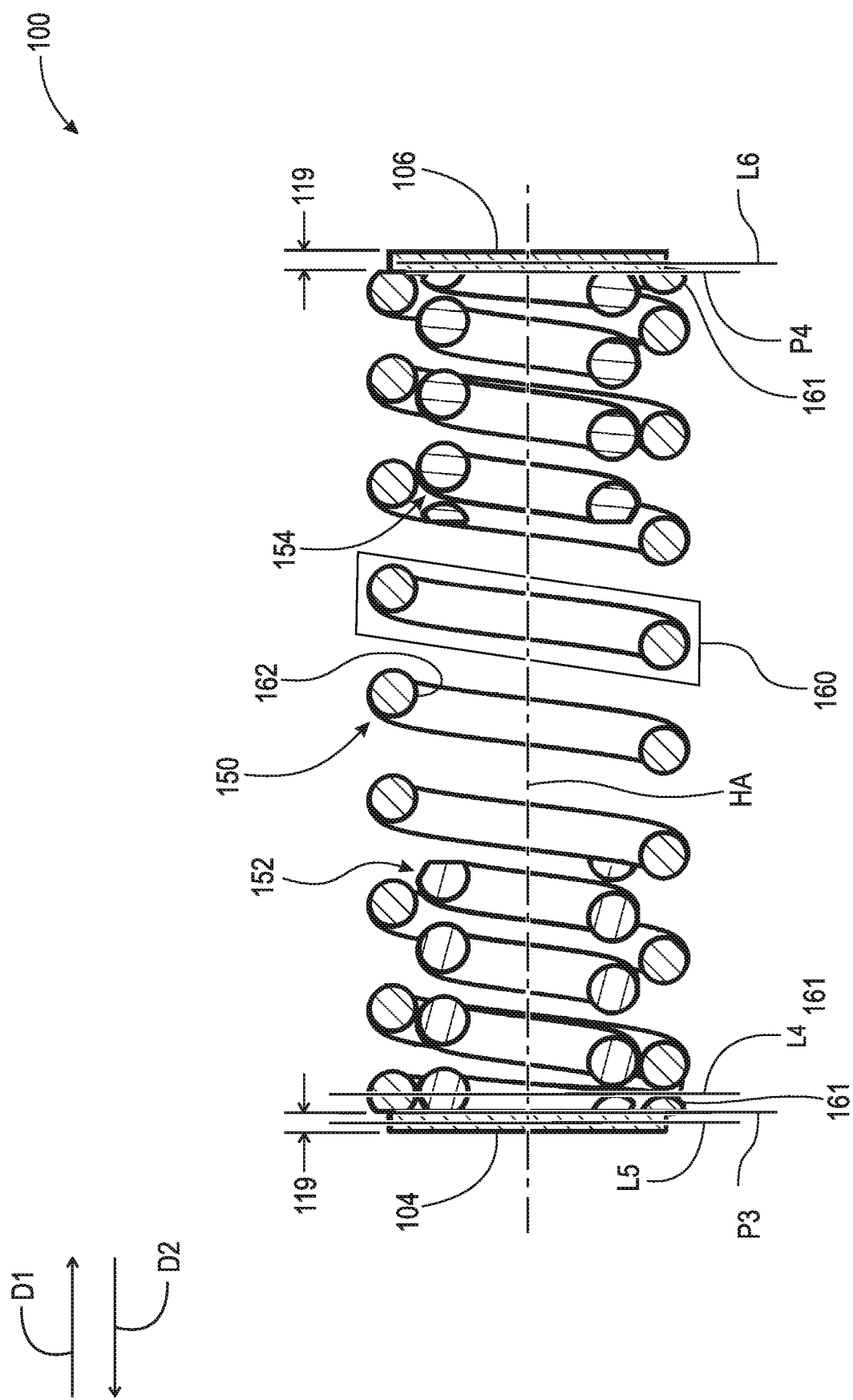
FIG. 5 is a cross-sectional view of a spring assembly with nested straight coil springs and adhered end caps.

FIG. 5 is a cross-sectional view of a spring assembly with nested straight coil springs and adhered end caps.

Figure 6A:
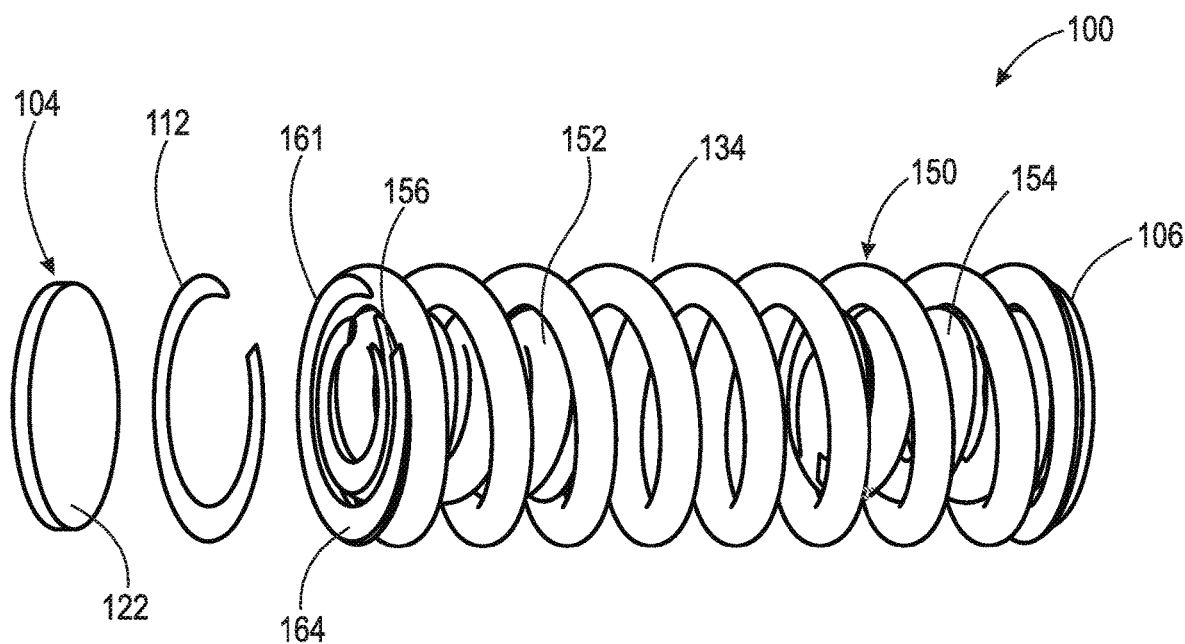
FIG. 6A is an exploded view of one longitudinal end of the spring assembly shown in FIG. 5.

FIG. 6A is an exploded view of one longitudinal end of the spring assembly shown in FIG. 5.

Figure 6B:
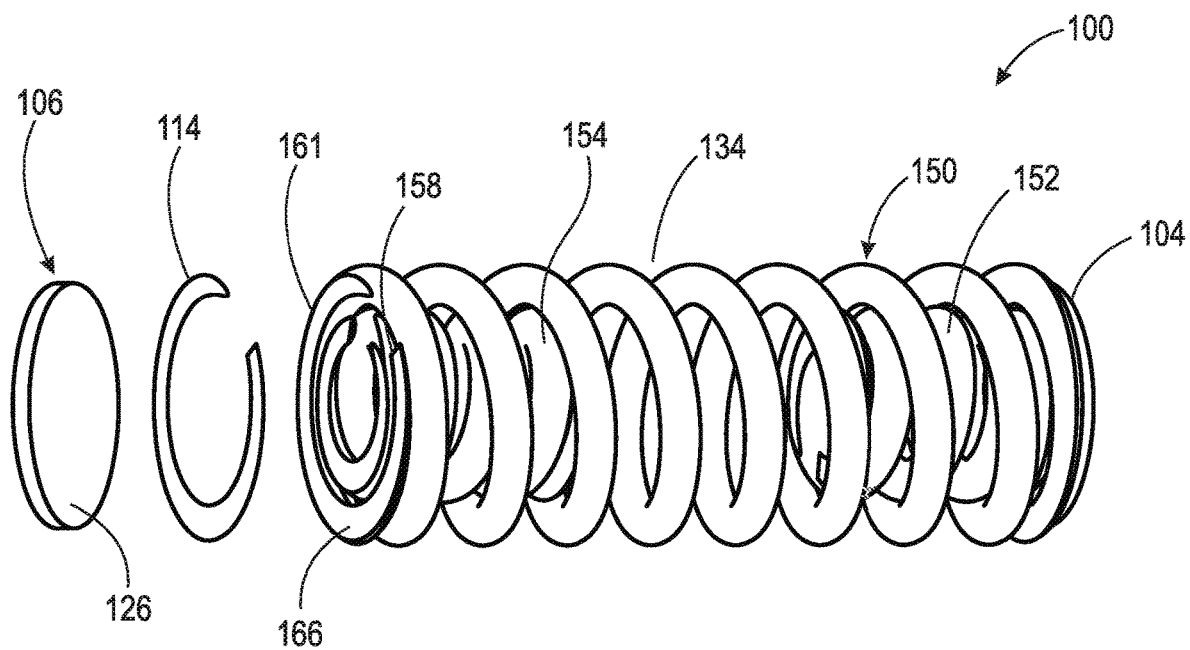
FIG. 6B is an exploded view of the other longitudinal end of the spring assembly shown in FIG. 5.

FIG. 6B is an exploded view of the other longitudinal end of the spring assembly shown in FIG. 5. The following should be viewed in light of FIGS. 5 through 6B. In the example of FIG. 5, coil spring assembly 100 includes: outer straight coil spring 150; inner straight coil spring 152; inner straight coil spring 154; end cap 104; end cap 106; and helical axis HA, Spring 150 includes longitudinal ends 156 and 158. End cap 104 is fixed to longitudinal end 156 with adhesive 112. End cap 106 is fixed to longitudinal end 158 with adhesive 114. The thickness of adhesives 112 and 114 in FIGS. 6A and 6B is exaggerated for purposes of presentation. Coil spring 150 includes: full coil turns 160; dead coil turns 161 at ends 156 and 158; and radially inner surface 162 formed by turns 160 and 161. Surface 162 faces axis HA.

In the example of FIG. 5: end caps 104 and 106 are not fixed to springs 152 and 154, respectively, with adhesive. In an example embodiment (not shown): end cap is 104 is adhered to springs 150 and 152; and end cap 106 is adhered to springs 150 and 154. In an example embodiment (not shown): end cap is 104 is adhered to spring 152; end cap 106 is adhered to spring 154 and neither cap 104 nor cap 106 is adhered to spring 150. In an example embodiment (not shown): end cap is 104 is adhered to springs 150 and 152; and end cap 106 is adhered to spring 154 and is not adhered to spring 150. In an example embodiment (not shown): end cap is 106 is adhered to springs 150 and 154; and end cap 104 is adhered to spring 152 and is not adhered to spring 150.

In an example embodiment: no portion of end cap 104 is fixedly connected to radially inner surface 162; or no portion of end cap 106 is fixedly connected to radially inner surface 162. In an example embodiment: no portion of end cap 104 is fixedly connected to radially inner surface 162; and no portion of end cap 106 is fixedly connected to radially inner surface 162.

In an example embodiment: no portion of end cap 104 is in contact with radially inner surface 162; or no portion of end cap 106 is in contact with radially inner surface 162. In an example embodiment: no portion of end cap 104 is in contact with radially inner surface 162; and no portion of end cap 106 is in contact with radially inner surface 162.

Longitudinal end 156 includes planar surface 164. End cap 104 includes planar surface 122. Adhesive 112 fixedly connects surface 122 to surface 164. In an example embodiment, plane P3 is co-planar with surface 164 and no portion of end cap 104 extends past plane P3 in direction D1. In an example embodiment, surface 164 and surface 122 are orthogonal to axis HA.

Longitudinal end 158 includes planar surface 166. End cap 106 includes planar surface 126. Adhesive 114 fixedly connects surface 126 to surface 166. In an example embodiment, plane P4 is co-planar with surface 166 and no portion of end cap 106 extends past plane P4 in direction D2. In an example embodiment, surface 166 and surface 126 are orthogonal to axis HA. Note that surface 117 at dead coil turns 116 is not in contact with end cap 104 or end cap 106. Thus, dead coil turns 116 are defined by contact between: surfaces 122 and 164; and surfaces 126 and 166.

In an example embodiment, no line, orthogonal to the helical axis, intersects: spring 150 and end cap 104; or spring 150 and end cap 106. For example: line L4, orthogonal to axis HA, intersects deal coil 161 without intersecting cap 104; line L5, orthogonal to axis HA, intersects cap 104 without intersecting spring 150; and line 16, orthogonal to axis HA, intersects cap 106 without intersecting spring 150.

Figure 7:
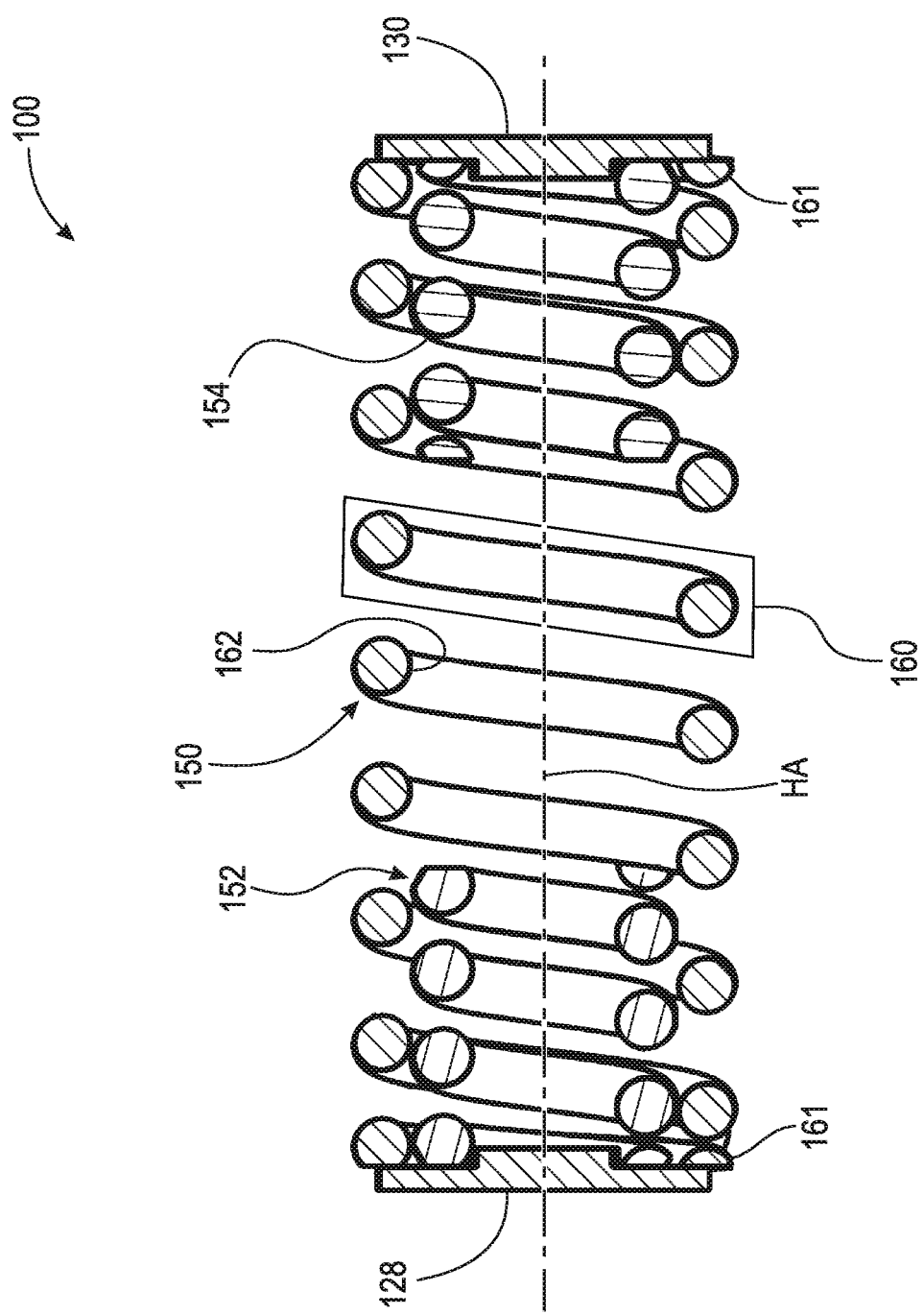
FIG. 7 is a cross-sectional view of a spring assembly with nested straight coil springs and adhered end caps including centering protrusions.

FIG. 7 is a cross-sectional view of a spring assembly with nested straight coil springs and adhered end caps including centering protrusions.

Figure 8A:
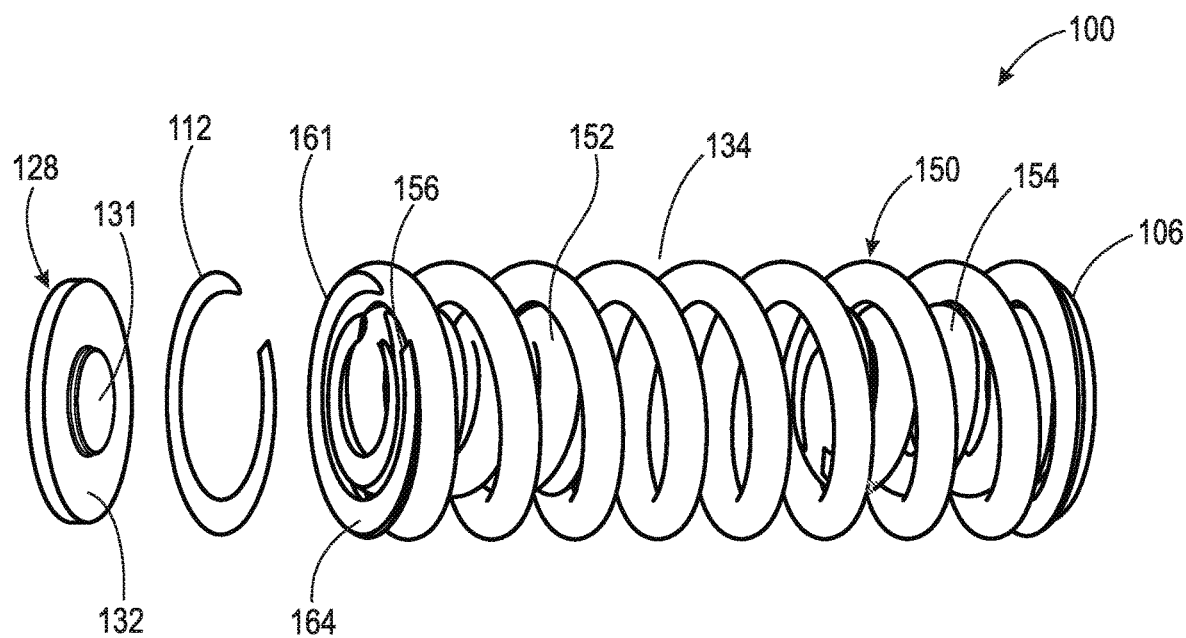
FIG. 8A is an exploded view of one longitudinal end of the spring assembly shown in FIG. 7.

FIG. 8A is an exploded view of one longitudinal end of the spring assembly shown in FIG. 7.

Figure 8B:
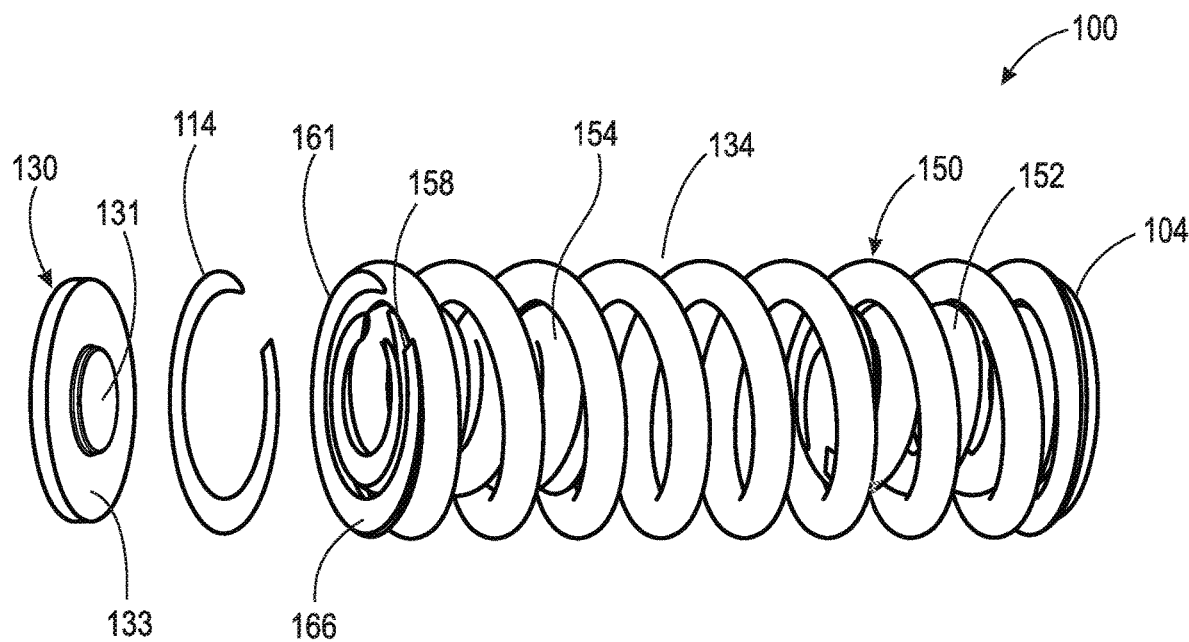
FIG. 8B is an exploded view of the other longitudinal end of the spring assembly shown in FIG. 7.

FIG. 8B is an exploded view of the other longitudinal end of the spring assembly shown in FIG. 7. The following should be viewed in light of FIGS. 7 through 8B. In the example of FIGS. 7 through 8B, end caps 128 and 130 replace end caps 104 and 106, respectively, in FIGS. 5 through 6B. End caps 128 and 130 include centering protrusion 131. End cap 128 is fixed to longitudinal end 156 with adhesive 112. End cap 130 is fixed to longitudinal end 158 with adhesive 114. The thickness of adhesives 112 and 114 in FIGS. 8A and 8B is exaggerated for purposes of presentation.

In the example of FIG. 7: end caps 128 and 130 are not fixed to springs 152 and 154, respectively, with adhesive. In an example embodiment (not shown): end cap is 128 is adhered to springs 150 and 152; and end cap 130 is adhered to springs 150 and 154. In an example embodiment (not shown): end cap is 128 is adhered to spring 152; end cap 130 is adhered to spring 154 and neither cap 128 nor cap 130 is adhered to spring 150. In an example embodiment (not shown): end cap is 128 is adhered to springs 150 and 152; and end cap 130 is adhered to spring 154 and is not adhered to spring 150. In an example embodiment (not shown): end cap is 130 is adhered to springs 150 and 154; and end cap 128 is adhered to spring 152 and is not adhered to spring 150.

In an example embodiment: no portion of end cap 128 is fixedly connected to radially inner surface 162; or no portion of end cap 130 is fixedly connected to radially inner surface 162. In an example embodiment: no portion of end cap 128 is fixedly connected to radially inner surface 162; and no portion of end cap 130 is fixedly connected to radially inner surface 162.

End cap 128 includes planar surface 132. Adhesive 112 fixedly connects surface 132 to surface 164. In an example embodiment, surface 164 and surface 132 are orthogonal to axis HA. End cap 130 includes planar surface 133. Adhesive 114 fixedly connects surface 133 to surface 166. In an example embodiment, surface 166 and surface 133 are orthogonal to axis HA.

On cap 128, protrusions 131 extend past surface 164 in direction D1 and contact surface 162 to center cap 128 with respect to surface 162. On cap 130, protrusions 131 extend past surface 166 in direction D2 and contact surface 162 to center cap 130 with respect to surface 162.

Protrusions 131 contact surfaces 162; however, protrusions 131 are not compressively engaged with surfaces 162 and do not prevent movement of coil turns 160 in contact with protrusions 131. Stated otherwise, protrusions 131 are not fixedly connected to surface 162 and do not produce dead coil turns in spring 150. Note that surface 117 at dead coil turns 116 is not in contact with end cap 104 or end cap 106. Thus, dead coil turns 116 are formed by contact between: surfaces 132 and 164; and surfaces 133 and 166.

The following should be viewed in light of FIGS. 5 through 83. The only dead coil turns in assembly 100 are dead coil turns 161 at ends 156 and 158. The reduction in the number of dead coils is described in a variety of ways. Structurally, as noted above, caps 104, 106, 128 and 130 are not fixed to inner surface 162; therefore, coil turns 160 are free to expand and contract without interference from end caps 104 and 106 or end caps 128 and 130.

The reduction of dead coils also is describable in terms of spaces 134 between adjacent coil turns 160 and 161 or between adjacent coil turns 160. End cap 104 is displaceable, with respect to end cap 106 and along axis HA and end cap 106 is displaceable, with respect to end cap 104 and along axis HA. Since end caps 104 and 106 are not fixed to surface 162, such displacement increases or decreases spaces 134 in spring 150. For example, displacing end cap 104 toward end cap 106 and along axis HA compresses spring 150 and decreases spaces 134. In an example embodiment, every space 134 increases or decreases with displacement between caps 104 and 106. Thus, there are fewer dead coil turns in example spring assembly 100 shown in FIG. 5.

End cap 128 is displaceable, with respect to end cap 130 and along axis HA and end cap 130 is displaceable, with respect to end cap 128 and along axis HA. Since end caps 128 and 130 are not fixed to surface 162, such displacement increases or decreases spaces 134 in spring 150. For example, displacing end cap 128 toward end cap 130 and along axis HA compresses spring 150 and decreases spaces 134. In an example embodiment every space 134 increases or decreases with displacement between caps 128 and 130. Thus, there are fewer dead coil turns in example spring assembly 100 shown in FIG. 7.

In an example embodiment (not shown), assembly 100 includes outer spring 102 and does not include inner spring 118. In an example embodiment (not shown), assembly 100 includes outer spring 150 and does not include inner spring 152 or inner spring 154.

Figure 9:
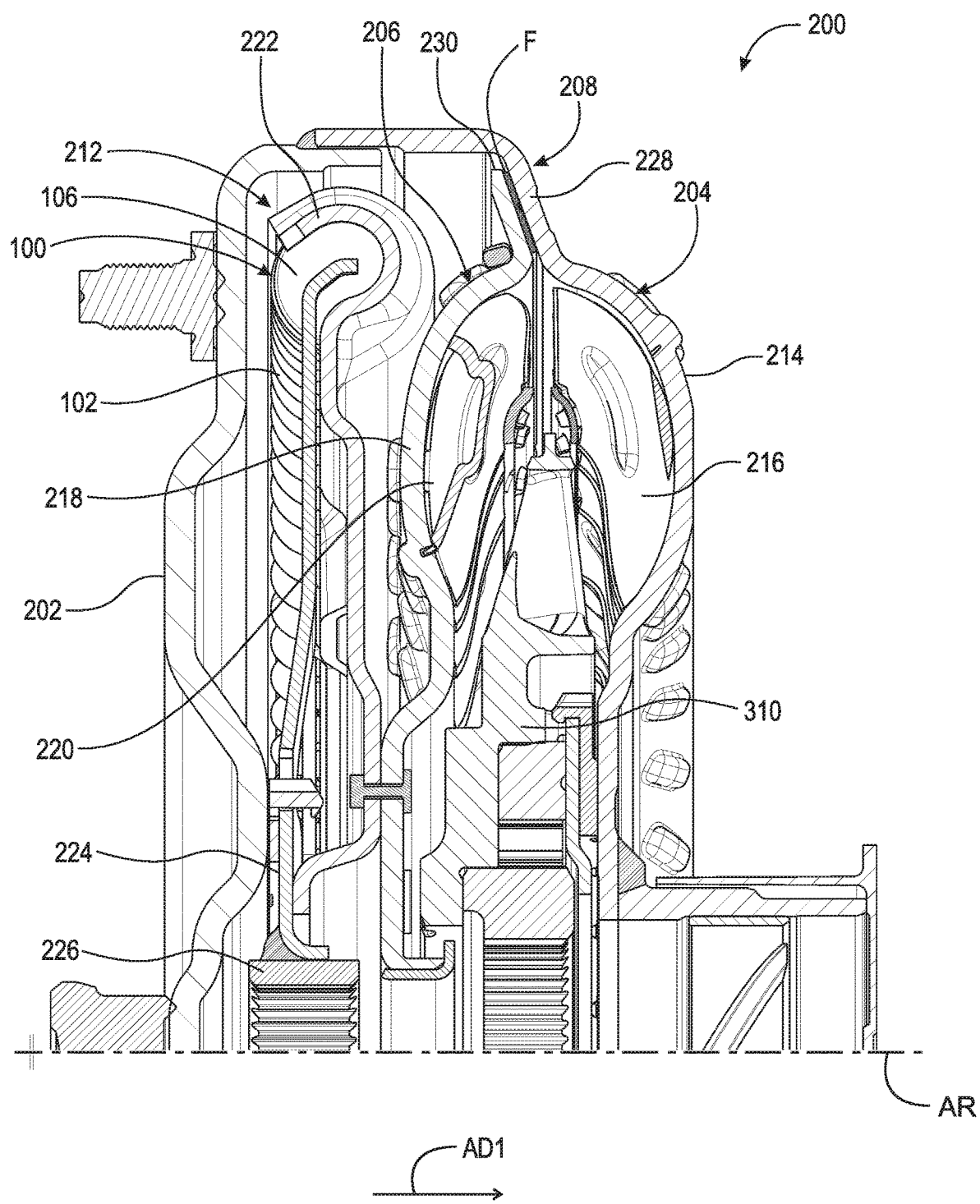
FIG. 9 is a partial cross-sectional view of an example torque converter including a vibration damper with spring assemblies as shown in FIG. 1.

FIG. 9 is a partial cross-sectional view of an example torque converter including a vibration damper with spring assemblies as shown in FIGS. 1 through 2B. The following should be viewed in light of FIGS. 1 through 2B and 9. Torque converter 200 includes: axis of rotation AR; cover 202; impeller 204; turbine 206; lock-up turbine clutch 208; stator 210; and vibration damper 212. Cover 202 is arranged to receive the rotational torque. Impeller 204 includes: impeller shell 214 non-rotatably connected to cover 202; and at least one impeller blade 216 non-rotatably connected to shell 214. Turbine 206 is in fluid communication with impeller 204 and includes: turbine shell 218; and at least one turbine blade 220 non-rotatably connected to shell 218. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Figure 10:
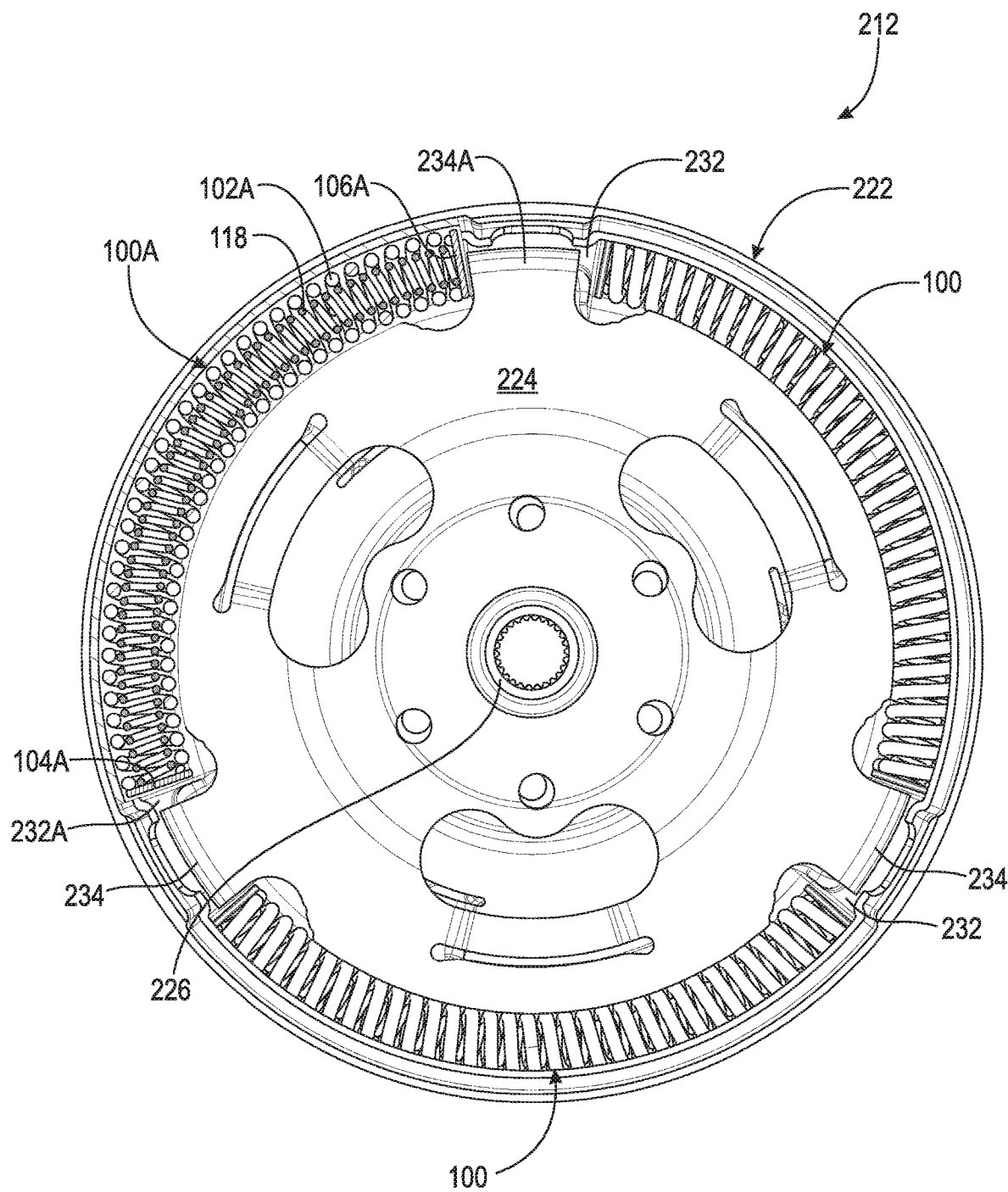
FIG. 10 is a front view of the damper shown in FIG. 9.

FIG. 10 is a front view of the damper shown in FIG. 9. The following should be viewed in light of FIGS. 1 through 2B, 9 and 10. Damper 212 includes: input 222 non-rotatably connected to shell 218; output 224 non-rotatably connected to output hub 226, which is arranged to non-rotatably connect to a transmission input shaft (not shown); and coil spring assemblies 100, with arc springs 102 and end caps 104 and 106. Assemblies 100 are engaged with input 222 and output 224 and are arranged to transmit torque between input 222 and output 224. In an example embodiment, assemblies 100 are in contact with input 222 and output 224.

Clutch 208 includes outer portion 228 of shell 214, outer portion 230 of shell 218, and friction material F, axially disposed between portions 228 and 230. Shell 218 is axially displaceable to open and close clutch 208. As is known in the art, for a lock-up mode for torque converter 200, shell 218 is displaced in axial AD1, for example by fluid in torque converter 200, to close clutch 208 and non-rotatably connect cover 202 and shell 218.

In the example of FIGS. 9 and 10: input 222 includes three drive protrusions 232; output 224 includes three drive protrusions 234; damper 212 includes three assemblies 100 disposed between and engaged with respective protrusions 232 and 234. In an example embodiment, assemblies 100 are in contact with respective protrusions 232 and 234. Each end cap 104 is engaged with a respective protrusion 232 and each end cap 106 is engaged with a respective protrusion 234. For example: end cap 104A of assembly 100A is in contact with drive protrusion 232A; and end cap 106A of assembly 100A is in contact with drive protrusion 234A. Note that assembly 100A has been cross-sectioned to more clearly show spring 118.

In an example embodiment (not shown), damper 212 includes spring assemblies 100 with springs 102 and 118 and end caps 128 and 130.

Figure 11:
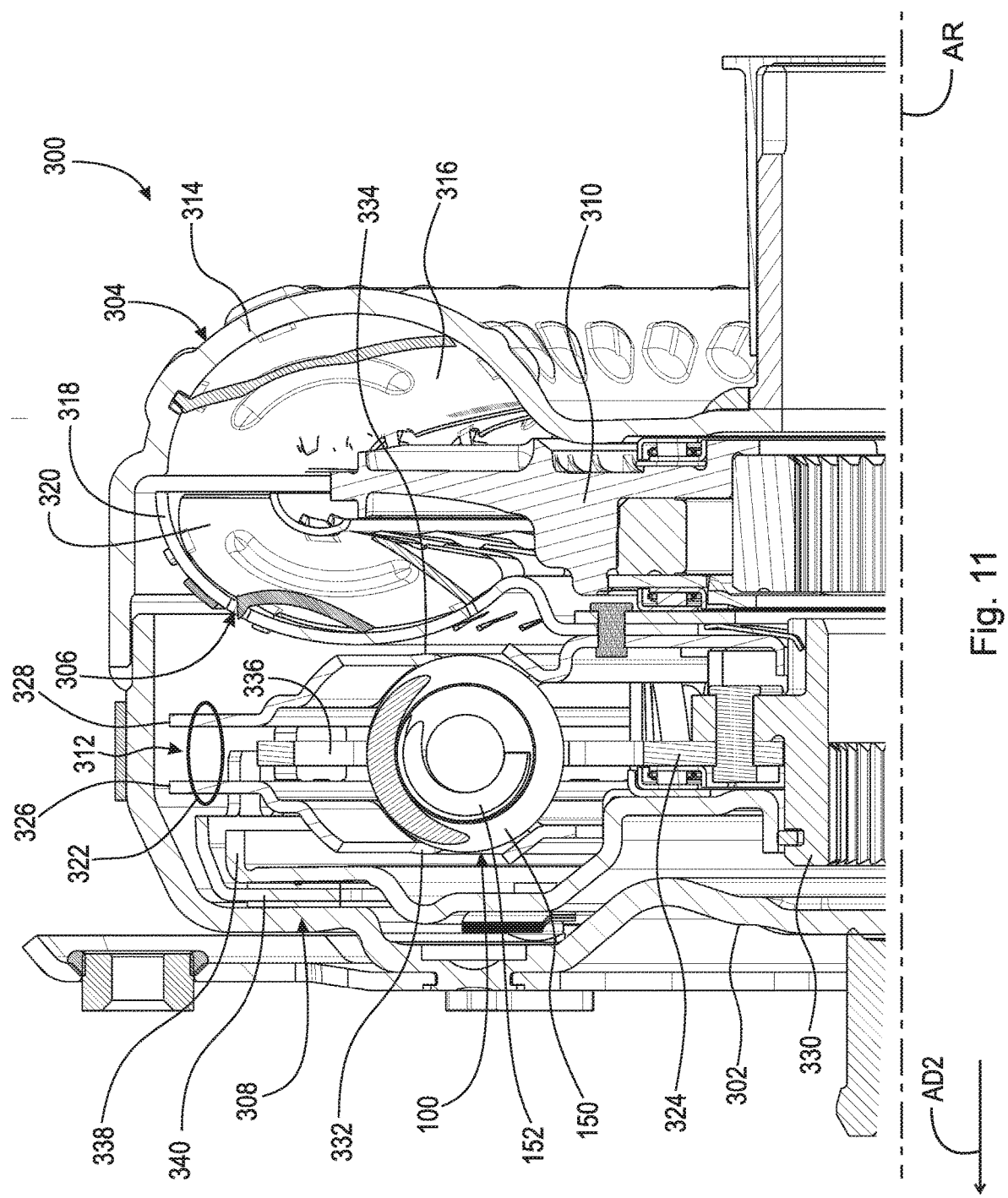
FIG. 11 is a partial cross-sectional view of an example torque converter including a vibration damper with spring assemblies as shown in FIG. 5.

FIG. 11 is a partial cross-sectional view of an example torque converter including a vibration damper with spring assemblies as shown in FIG. 5. The following should be viewed in light of FIGS. 5 through 8B and 11. Torque converter 300 includes: axis of rotation AR; cover 302; impeller 304; turbine 306; lock-up clutch 308; stator 310; and vibration damper 312. Cover 302 is arranged to receive the rotational torque. Impeller 304 includes: impeller shell 314 non-rotatably connected to cover 302; and at least one impeller blade 316 non-rotatably connected to shell 314. Turbine 306 is in fluid communication with impeller 304 and includes: turbine shell 318; and at least one turbine blade 320 non-rotatably connected to shell 318.

Damper 312 includes: input 322; output 324; and multiple coil spring assemblies 100, with straight springs 150, 152 and 154, and end caps 104 and 106. Input 322 is non-rotatably connected to turbine shell 318 and includes non-rotatably connected cover plates 326 and 328. Output 324 is non-rotatably connected to output hub 330, which is arranged to non-rotatably connect to a transmission input shaft (not shown). Assemblies 100 are engaged with input 322 and output 324 and are arranged to transmit torque between input 322 and output 324. In an example embodiment, assemblies 100 are in contact with input 322 and output 324.

Cover plates 326 and 328 include openings 332 and 334, respectively. Output 324 includes openings 336. Each assembly 100 is disposed in an opening 332, an opening 334, and an opening 336.

Clutch 308 includes piston plate 338 and clutch plate 340 non-rotatably connected to input 322. As is known in the art, for a lock-up mode for torque converter 300, piston plate 338 is displaced in axial AD2, for example by fluid in torque converter 300, to close clutch 308 and non-rotatably connect cover 302, clutch plate 340, piston plate 338, and input 322.

Figure 12:
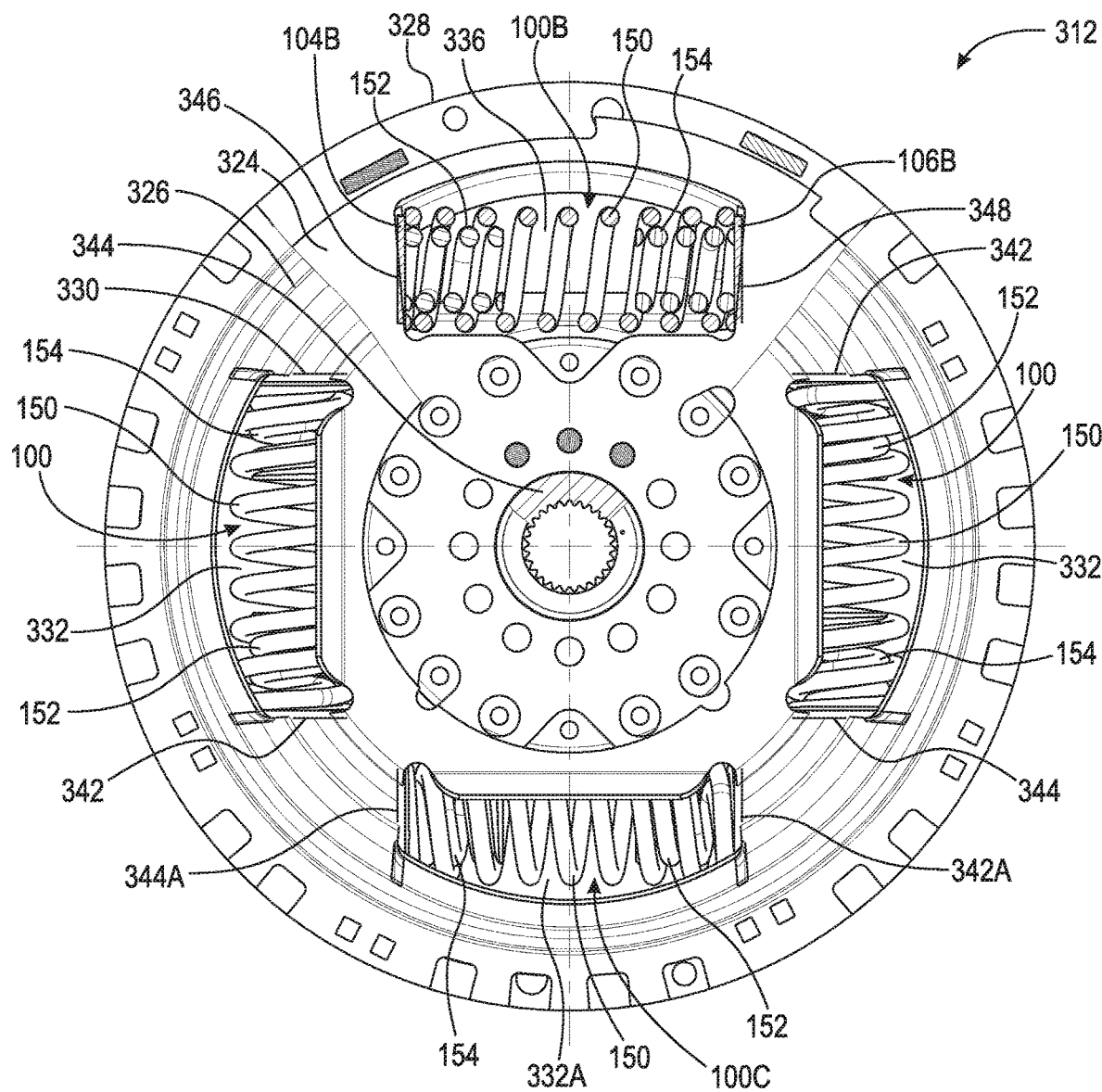
FIG. 12 is a front view of the damper shown in FIG. 11.

FIG. 12 is a front view of the damper shown in FIG. 11. The following should be viewed in light of FIGS. 5 through 8B, 11 and 12. In FIG. 12, cover plate 326 has been partially cut-away to show the engagement of assembly 100B with output 324. In the example of FIGS. 11 and 12: cover plates 326 and 328 includes four openings 332 and 334, respectively; output 324 includes four openings 336; and damper 312 includes four assemblies 100 with straight springs 150, 152 and 154, and end caps 104 and 106. Each opening 332 includes end surfaces 342 and 344 engaged with a respective assembly 100. Each opening 336 includes end surfaces 346 and 348 engaged with a respective assembly 100. In an example embodiment: each opening 332 includes end surfaces 342 and 344 in contact with a respective assembly 100; and each opening 336 includes end surfaces 346 and 348 in contact with a respective assembly 100.

For example: end caps 104B and 106B of assembly 100B are in contact with end surfaces 346 and 348, respectively. For example, assembly 100C is in contact with end surfaces 342A and 344A of opening 332A. Note that assembly 100B has been cross-sectioned to more clearly show springs 152 and 154.

In an example embodiment (not shown) damper 312 includes spring assemblies 100 with springs 150, 152 and 154, and end caps 128 and 130.

Any suitable adhesive known in the art can be used for adhesives 112 and 114. For example, for use of spring assembly 100 in a torque converter, adhesive 112 and 114 are compatible with automatic transmission fluid. Suitable options for adhesives 112 and 114 include, but are not limited to: an adhesive film, which is tacked onto, for example surfaces 122 and 126, on a heated press; two-step epoxy adhesive combined with pressure; and contact adhesive combined with pressure. End caps 104, 106, 128, and 130 can be made of any material known in the art, including, but not limited to, metal and plastic.

The following should be viewed in light of FIGS. 1 through 8B. The following describes a method assembling a coil spring assembly. Although the method is presented as a sequence of steps for clarity, no order should be inferred from the sequence unless explicitly stated. A first step fixedly connects, with a first adhesive, a first end cap to a first longitudinal end of a coil spring. A second step fixedly connects, with a second adhesive, a second end cap to a second longitudinal end of the coil spring.

In an example embodiment, a third step: avoids contacting a radially inner surface of the coil spring with the first end cap; or, avoids contacting a radially inner surface of the coil spring with the second end cap. In an example embodiment, a fourth step: centers, with at least one protrusion of the first end cap, the first end cap with respect to a radially inner surface of the coil spring; or centers, with at least one protrusion of the second end cap, the second end cap with respect to a radially inner surface of the coil spring. In an example embodiment, a fifth step avoids a fixed connection between any two adjacent coil turns of the coil spring.

The performance of spring assemblies 100 is improved by: reducing the mass (and associated hysteresis) of assemblies 100; and reducing the number of dead coil turns 116 and 161. In particular: reducing the mass of end caps 104, 106, 128 and 130 reduces the mass of respective assemblies 100; and reducing the number of dead coil turns improves the spring rate for respective assemblies 100. In addition, since the stresses associated with press-fitting end caps are not imparted during the assembly assemblies 100, higher grade materials, such as nitrided steel, can be used for the coil springs in the various embodiments of assembly 100 described above. The use of the higher grade material increases the spring rate of the coil springs, and hence the performance of assemblies 100.

The respective masses of end caps 104, 106, 128 and 130 are reduced, in comparison to known press-fit or snap fit end caps, at least because end caps 104, 106, 128, and 130 do not include the relatively massive shank of a press-fit or snap-fit end cap. Centering protrusions 131 for caps 128 and 130 can be made relatively small with nominal mass; therefore, maintaining the relative smaller mass of caps 128 and 130 in comparison to known end caps.

It should be understood that spring assembly 100 is not limited to use in a particular configuration of vibration damper and can be used in any vibration damper configuration known in the art using spring assemblies. It should also be understood that a vibration damper including spring assemblies 100 is not limited to use in a particular configuration of torque converter and can be used in any torque convert configuration known in the art using spring assemblies.

It should be understood that spring assembly 100 is not limited to use in a vibration damper and can be used in any device using spring assemblies, including, but not limited to: a dual mass flywheel; a manual disk; a clutch pack; various components of a transmission; and an engine valve.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
AR axis of rotation
D1 direction
D2 direction
F friction material
HA helical axis
L1 line
L2 line
L3 line
L4 line
L5 line
L6 line
P1 plane
P2 plane
P3 plane
P4 plane
100 coil spring assembly
100A coil spring assembly
100B coil spring assembly
100C coil spring assembly
102 arc coil spring
104 end cap
104A end cap
104B end cap
106 end cap
106A end cap
106B end cap
108 longitudinal end
110 longitudinal end
112 adhesive
114 adhesive
115 full coil turn, outer arc spring
116 dead coil turn, outer arc spring
117 radially inner surface
118 inner arc coil spring
119 thickness, end cap
120 planar surface
122 planar surface, cap 104
124 planar surface
126 planar surface, cap 106
128 end cap
130 end cap
131 centering protrusion
132 planar surface, cap 128
133 planar surface, cap 130
134 space
150 outer straight coil spring
152 inner straight coil spring
154 inner straight coil spring
156 longitudinal end, outer straight coil spring
158 longitudinal end, outer straight coil spring
160 full coil turn, outer straight coil spring
161 dead coil turn, outer straight coil spring
162 radially inner surface, outer straight coil spring
164 planar surface
166 planar surface
200 torque converter
202 cover
204 impeller
206 turbine
208 lock-up turbine clutch
210 stator
212 vibration damper
214 impeller shell
216 impeller blade
218 turbine shell
220 turbine blade
222 input
224 output
226 output hub
228 outer portion, shell 214
230 outer portion, shell 228
232 drive protrusion, input
232A drive protrusion, input
234 drive protrusion, output
234A drive protrusion, output
300 torque converter
302 cover
304 impeller
306 turbine
308 lock-up clutch
310 stator
312 vibration damper
314 impeller shell
316 impeller blade
318 turbine shell
320 turbine blade
322 input
324 output
326 cover plate
328 cover plate
330 output hub
332 opening, cover plate 326
332A opening, cover plate 326
334 opening, cover plate 328
336 opening, output
338 piston plate
340 clutch plate
342 end surface, opening 332
344 end surface, opening 332
346 end surface, opening 338
348 end surface, opening 338
400 prior art spring assembly
402 outer coil spring
403 inner coil spring
404 end cap 406 shank, end cap
408 dead coil turn
410 dead coil turn
412 space
500 prior art coil spring assembly
502 straight coil spring
504 straight coil spring
506 straight coil spring
508 press-fit end cap
510 shank
512 dead coil spring
514 dead coil spring
516 space

The invention claimed is:

1. A coil spring assembly, comprising:
a coil spring including:
a first longitudinal end; and,
a second longitudinal end;
a first end cap fixedly connected to the first longitudinal end with a first adhesive; and
a second end cap fixedly connected to the second longitudinal end with a second adhesive, wherein:
the first longitudinal end includes a first planar surface;
the first end cap includes a second planar surface fixed to the first planar surface with the first adhesive;
the second longitudinal end includes a first planar surface; and,
the second end cap includes a second planar surface fixed to the first planar surface of the second longitudinal end with the second adhesive.

2. The coil spring assembly of claim 1, wherein:
the coil spring includes:
a helical axis between the first longitudinal end and the second longitudinal end; and,
a radially inner surface facing the helical axis; and,
no portion of the first end cap is:
in contact with the radially inner surface; and,
fixedly connected to the radially inner surface; or,
no portion of the second end cap is:
in contact with the radially inner surface; and,
fixedly connected to the radially inner surface.

3. The coil spring assembly of claim 1, wherein:
the coil spring includes:
a helical axis between the first longitudinal end and the second longitudinal end; and,
a radially inner surface facing the helical axis; and,
no portion of the first end cap is in contact with the radially inner surface; or,
no portion of the second end cap is in contact with the radially inner surface.

4. The coil spring assembly of claim 1, wherein:
the coil spring includes:
a helical axis between the first longitudinal end and the second longitudinal end;
a plurality of coil turns; and,
a respective space between every pair of coil turns, included in the plurality of coil turns, adjacent to each other in a direction along the helical axis;
every coil turn of the coil spring is included in a respective pair of coil turns; and,
one of the first end cap or the second end cap is displaceable, with respect to the other of the first end cap or the second end cap, along the helical axis to:
increase every respective space; or,
decrease every respective space.

5. The coil spring assembly of claim 1, wherein:
the coil spring includes a helical axis between the first longitudinal end and the second longitudinal end;
the first longitudinal end includes a first planar surface fixed to the first end cap with the first adhesive;
the second longitudinal end includes a second planar surface fixed to the second end cap with the second adhesive; and,
no portion of the first end cap extends past the first planar surface along the helical axis and toward the second longitudinal end; or,
no portion of the second end cap extends past the second planar surface along the helical axis and toward the first longitudinal end.

6. The coil spring of claim 1, wherein:
the coil spring includes a helical axis between the first longitudinal end and the second longitudinal end; and
no line, orthogonal to the helical axis, intersects:
the coil spring and the first end cap; or,
the coil spring and the second end cap.

7. The coil spring assembly of claim 1, wherein:
the coil spring includes:
a helical axis between the first longitudinal end and the second longitudinal end; and,
a radially inner surface facing the helical axis; and,
the first end cap includes at least one protrusion in contact with the radially inner surface and centering the first end cap with respect to the radially inner surface; or,
the second end cap includes at least one protrusion in contact with the radially inner surface and centering the second end cap with respect to the radially inner surface.

8. The coil spring assembly of claim 7, wherein:
the first end cap includes the at least one protrusion and the at least one protrusion is not fixedly connected to the radially inner surface; or,
the second end cap includes the at least one protrusion and the at least one protrusion is not fixedly connected to the radially inner surface.

9. The coil spring assembly of claim 1, wherein:
the coil spring is an arc coil spring; or,
the coil spring is a straight coil spring.

10. A vibration damper, comprising:
an input arranged to receive torque;
an output arranged to transmit the torque; and,
a plurality of coil spring assemblies arranged to transmit the torque from the input to the output, each coil spring assembly including:
a coil spring including:
a first longitudinal end;
a second longitudinal end;
a first end cap fixedly connected to the first longitudinal end with a first adhesive; and,
a second end cap fixedly connected to the second longitudinal end with a second adhesive.

11. The vibration damper of claim 10, wherein:
the vibration damper is disposed in a torque converter;
the torque converter includes:
a cover arranged to receive the torque;
an impeller non-rotatably connected to the cover; and,
a turbine in fluid communication with the impeller.

12. The vibration damper of claim 10, wherein:
the coil spring includes:
a helical axis between the first longitudinal end and the second longitudinal end; and
a radially inner surface facing the helical axis;

no portion of the first end cap is in contact with the radially inner surface; or, no portion of the second end cap is in contact with the radially inner surface.

13. The vibration damper of claim 10, wherein:

the coil spring includes:
- a helical axis between the first longitudinal end and the second longitudinal end; and
- a radially inner surface facing the helical axis; and,
  no portion of the first end cap is:
  - in contact with the radially inner surface; and,
  - fixedly connected to the radially inner surface; or,
  no portion of the second end cap is:
  - in contact with the radially inner surface; and,
  - fixedly connected to the radially inner surface.

14. The vibration damper of claim 10, wherein:

the coil spring includes:
- a helical axis between the first longitudinal end and the second longitudinal end; and
- a radially inner surface facing the helical axis; and,
  the first end cap includes at least one protrusion in contact with the radially inner surface and centering the first end cap with respect to the radially inner surface; or,
  the second end cap includes at least one protrusion in contact with the radially inner surface and centering the second end cap with respect to the radially inner surface.

15. The vibration damper of claim 10, wherein:

the coil spring includes:
- a helical axis between the first longitudinal end and the second longitudinal end;
- a plurality of coil turns; and,
- a respective space between every pair of coil turns, included in the plurality of coil turns, adjacent to each other in a direction along the helical axis;

every coil turn of the coil spring is included in a respective pair of coil turns; and, one of the first end cap or the second end cap is displaceable, with respect to the other of the first end cap or the second end cap, along the helical axis to:
- increase every respective space; or,
- decrease every respective space.

16. A method of fabricating a coil spring assembly, comprising:

fixedly connecting, with a first adhesive, a first end cap to a first longitudinal end of a coil spring; and, fixedly connecting, with a second adhesive, a second end cap to a second longitudinal end of the coil spring, wherein:
- fixedly connecting, with the first adhesive, the first end cap to the first longitudinal end of the coil spring includes fixedly connecting a planar surface of the first end cap to a planar surface of the first longitudinal end; and,
- fixedly connecting, with the second adhesive, the second end cap to the second longitudinal end of the coil spring includes fixedly connecting a planar surface of the second end cap to a planar surface of the second longitudinal end.

17. The method of claim 16, further comprising:

avoiding contacting a radially inner surface of the coil spring with the first end cap; or, avoiding contacting a radially inner surface of the coil spring with the second end cap.

18. The method of claim 16, further comprising:

centering, with at least one protrusion of the first end cap, the first end cap with respect to a radially inner surface of the coil spring; or, centering, with at least one protrusion of the second end cap, the second end cap with respect to a radially inner surface of the coil spring.

* * * * *